UNITED STATES PATENT OFFICE.

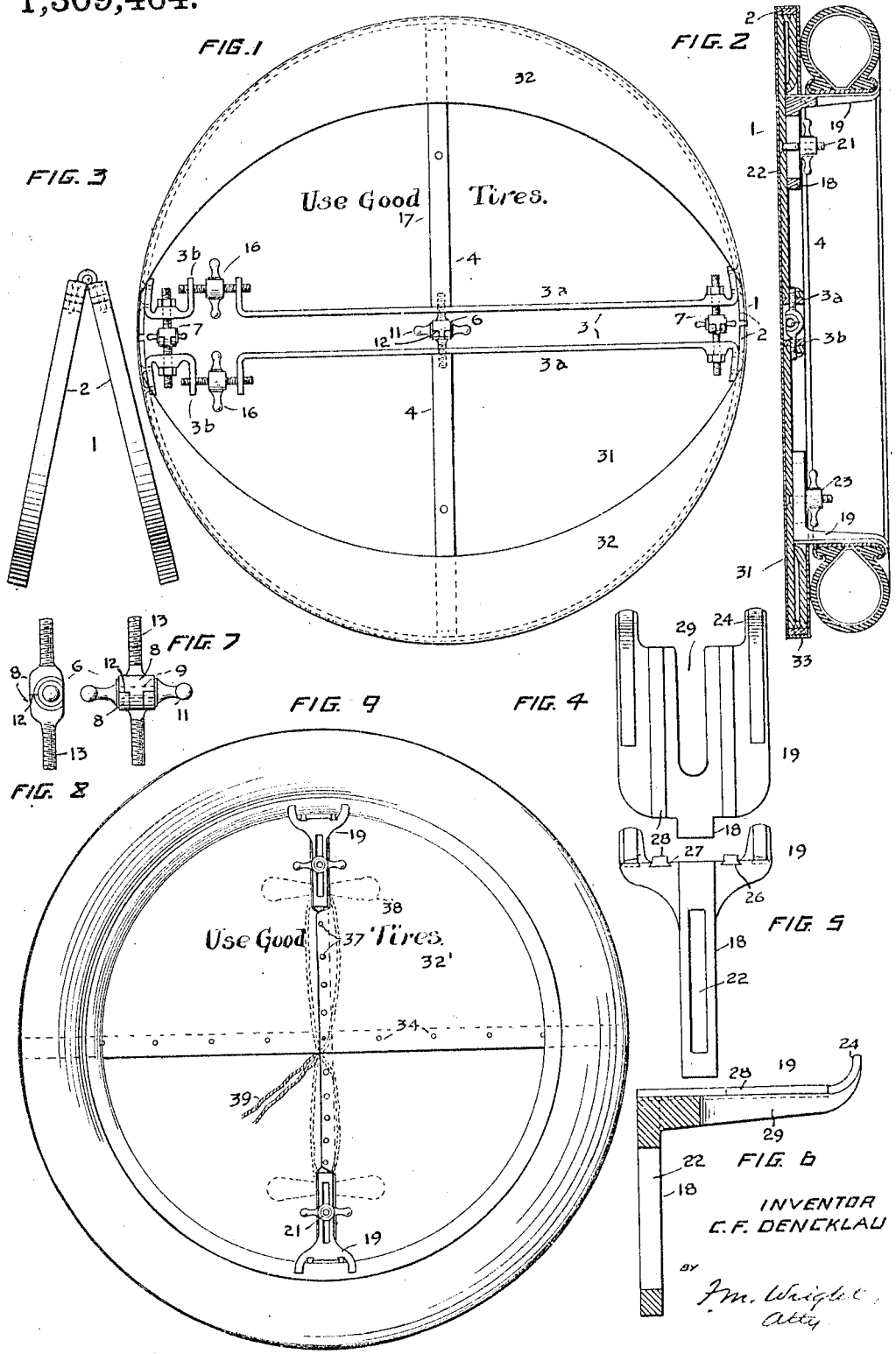

CHARLES F. DENCKLAU, OF LOS ANGELES, CALIFORNIA.

ADVERTISING ATTACHMENT TO WHEEL-RIMS.

1,309,464. Specification of Letters Patent. Patented July 8, 1919.

Application filed August 6, 1918. Serial No. 248,510.

*To all whom it may concern:*

Be it known that I, CHARLES F. DENCKLAU, a citizen of the United States, residing at Los Angeles, in the county of Los Angeles and State of California, have invented new and useful Improvements in Advertising Attachments to Wheel-Rims, of which the following is a specification.

The object of the present invention is to provide a device which can be readily extended and attached to a spare demountable rim of an automobile when it is desired to use it for advertising purposes, and which can be readily collapsed and removed from the automobile when the automobile is not in use for business purposes.

In the accompanying drawing, Figure 1 is a rear view of my improved rim attachment, the claws thereof being omitted from the drawing; Fig. 2 is a vertical sectional view thereof showing also a rim and tire thereon; Fig. 3 is a side view of a frame of the attachment collapsed; Fig. 4 is an enlarged top plan view of a claw forming part of my invention; Fig. 5 is an inner view thereof; Fig. 6 is a central sectional view thereof; Fig. 7 is an enlarged front view of a hinge; Fig. 8 is a side view of the same; Fig. 9 is a rear view of a modified form of the attachment with a rim and tube thereon.

Referring to the drawing, 1 indicates frame sections, each comprising a substantially semi-circular rim 2, a rod 3, in sections $3^a$, $3^b$, extending approximately diametrically and riveted at its ends to the ends of the rim 2, and a bar 4 extending radially and connecting the centers of the rim 2 and rod 3. The diametrically extending rods 3 of said frame sections are connected by a central hinge 6 and two terminal hinges 7. Each hinge comprises hinge members 8 pivoted on a central pin 9, which pin has handles 11 extending outside the knuckles of the hinge on both sides for a purpose which will hereinafter appear. Said hinge members 8, like those of a pair of compasses, are formed with shoulders 12 abutting against each other when the members are in alinement to arrest the opening movement of the hinge members, while permitting them to be moved together or collapsed. Each hinge member 8 has threaded stems 13, the threads of the two members of each hinge being right and left respectively. The threaded stems 13 of the terminal hinges are screwed through the rods 3 of the two frame sections, and lock nuts 14 are screwed on said stems to lock the same in the positions to which they have been so screwed. The stems of the central hinge 9 are screwed into correspondingly threaded sockets in the inner ends of the bars 4. The purpose of the hinge handles 11 is to turn the hinge when its two members extend in alinement, and thus to cause the frame sections either to contract or to expand, depending upon the direction of the turning movement. Each rod 3 of the frame can in like manner be expanded and contracted by means of a device 16 in the nature of a turnbuckle having on its ends right and left threads which screw into correspondingly threaded holes in portions of the section $3^a$, $3^b$, bent at right angles from the remainder.

From the bars 4 of the frame extend rearwardly bolts 21 which pass through slots 22 in longitudinally extending members 18 of claws 19, said claws being secured in any desired longitudinal position relative to said bars 4 by thumb nuts 23 screwed on said bolts by which the claws can be locked wherever desired. Said claws 19 extend from said bars 4 at right angles to said frame and are bent outwardly at their outer ends, as shown at 24, to engage diametrically opposite portions of the rim of a square demountable rim carried at the back of an automobile. The surfaces of said claws in proximity to said rim have undercut grooves 26 in which are received beveled portions 27 of rubber strips 28 which extend outside said surfaces, and are in contact with said rim, these strips being provided to prevent rattling and avoid marring the paint of the rim by contact thereof with the metal portions of the claws. Said claws are preferably cutaway at the center, as shown at 29, to permit, if necessary, engagement of the claw with that portion of the rim from which extends the air tube or a device for securing the rim by means of a lock.

31 indicates an advertising cover for the frame, circular in form, and the front side of which, when stretched by the frame, is smooth, so as to exhibit plainly display matter 30 shown in dotted lines in Fig. 1. The rear side comprises two separate portions 32 secured to the front side by a narrow band 33 which extends around the rim of the frame. Said cover is placed in the frame when it is in the collapsed position shown in Fig. 3, and then, when the two parts of the frame are moved outwardly into a single plane, as shown in Fig. 2, and if the frame is of sufficient size, the cover is then stretched tight thereby. If it is not stretched tight, the frame can be expanded by turning either the handles 11 or the turnbuckles 16.

The above described cover is suitable for advertising in daylight, but in Figs. 5, 6, I illustrate a frame and cover which are more suitable for advertising at night time. In this form of the invention the cover differs from that shown in Fig. 3 in that the back portions 32' of the cover are approximately semi-circular and overlap, and are secured together by glove fasteners 34. They are slit at right angles to their diametrically extending edges to receive the claws 19 and the bolts 21 when the cover is on the frame, and the margins next to said slits are attached to each other by glove fasteners 37. To the radially extending bars are secured electric lamp sockets 38, to which electricity is supplied by a cord 39. Lamps in these sockets illuminate the front portion of the cover which is translucent, while the rear portions of the cover are opaque and prevent light therefrom passing through.

It will thus be seen that I provide means for taking advantage for advertising purposes of the large and conspicuous space at the back of a spare rim of an automobile when in use for business purposes, while at the same time the means for doing so are readily collapsible so that it can be removed when the machine is to be used for other than business purposes, by which means also it can be insured that the advertising frame will be always stretched tight and smooth, and that therefore the advertising matter thereon will be easily read.

I claim:

1. The combination of a collapsible and extensible frame, adjustable means carried thereby and adapted to engage a part of a wheel for securing said frame thereto, and a flexible cover for inclosing said frame having display matter thereon, and of suitable size and shape to be stretched tight by said frame when extended.

2. The combination of a frame comprising two sections hinged together, means for expanding and contracting each section parallel with, and at right angles to, the hinge axis, means carried by each section for engaging a wheel rim, and a flexible cover for inclosing said frame, having display matter thereon, and of such form that it can be stretched tight by said frame.

3. The combination of a collapsible and extensible frame, adjustable means carried thereby and adapted to engage part of a wheel for securing said frame thereto, a flexible cover for inclosing said frame having display matter thereon, and of suitable size and shape to be stretched tight by the frame when extended, said means being provided with resilient surface for engaging said wheel part.

4. The combination of a collapsible and extensible frame, adjustable means carried thereby and adapted to engage a part of a wheel for securing said frame thereto, a translucent and flexible cover for inclosing said frame having display matter thereon and of suitable size and shape to be stretched tight by said frame when extended, and an electric lamp supported by said frame within said cover.

CHAS. F. DENCKLAU.

Copies of this patent may be obtained for five cents each, by addressing the "Commissioner of Patents, Washington, D. C."